United States Patent [19]

Evans et al.

[11] Patent Number: 4,458,043

[45] Date of Patent: Jul. 3, 1984

[54] WATERPROOF SHEETING

[75] Inventors: Edwin L. Evans, Upton on Severn; Ronald Sidebottom; David W. Price, both of Cheltenham; Roger L. Bonafont, Heetford, all of England

[73] Assignee: Coal Industry (Patents) Limited, London, England

[21] Appl. No.: 436,934

[22] Filed: Oct. 27, 1982

[30] Foreign Application Priority Data

Jun. 22, 1982 [GB] United Kingdom ................. 8217991

[51] Int. Cl.³ .............................................. C08L 95/00
[52] U.S. Cl. ...................................... 524/66; 428/220
[58] Field of Search ........................... 524/66; 428/220

[56] References Cited

U.S. PATENT DOCUMENTS

| Re. 29,548 | 2/1978 | Payne et al. | 524/66 |
| 2,635,085 | 4/1953 | Gonnard et al. | 524/66 |
| 2,697,697 | 12/1954 | Beck et al. | 524/66 |

Primary Examiner—Melvyn I. Marquis
Attorney, Agent, or Firm—Stevens, Davis, Miller & Mosher

[57] ABSTRACT

A waterproof sheeting exhibiting improved temperature characteristics and good properties when bonded with molten bitumen comprises by weight 10 to 40 parts of unplasticized PVC, 10 to 40 parts of an ethylene vinyl acetate carbon monoxide terpolymer and 5 to 35 parts of coal tar pitch.

8 Claims, No Drawings

WATERPROOF SHEETING

This invention concerns an improved waterproof sheeting, especially one suitable for roofing sheets or membranes for bridge decks or damp proof courses.

It is known to use sheeting compounded from PVC and pitch, reinforced with fibres and containing particulate filler as a damp proof course and for general waterproofing duties. Conventional building or constructional practice often involves the bonding of sheeting onto a substrate using molten bitumen. The known PVC/pitch sheetings exhibit the disadvantage that when bonded with bitumen, the sheeting shrinks and also the bitumen softens. This is a result of liquid plasticisers migrating from the sheeting into the bitumen, and the softening effect seriously impairs the adhesive bond strength of the bitumen and can result in slippage of the sheeting. In addition, the shrinkage of the sheets necessitates undesirably large overlaps between adjacent sheets during installation.

It is an aim of the present invention to provide a waterproof sheeting having improved dimensional stability when in contact with bitumen and which does not cause undue softening of the bitumen. It is also an aim of the invention to retain the desirable properties of flexible PVC over a wider range of temperatures.

The present invention provides a waterproof sheeting comprising 10 to 40 parts by weight of unplasticised PVC, 10 to 40 parts of an ethylene vinyl acetate carbon monoxide terpolymer and 5 to 35 parts of coal tar pitch. The sheeting suitably also contains 0 to 30 parts of particulate filler, 0 to 25 parts of fibrous filler, 0 to 15 parts of primary and/or secondary plasticiser and 0 to 10 parts of processing aids and/or stabilisers.

The amount of PVC is preferably in the range of 20 to 30% by wt of the entire composition, and may be a suspension or emulsion grade of PVC. The ethylene vinyl acetate carbon monoxide terpolymer may contain 15–85% ethylene, 5–60% vinyl acetate and 0.5–30% carbon monoxide. Such terpolymers are commercially available from du Pont de Nemours E. I. & Co. under the trade name "Elvaloy", and it is preferred to use the grade marketed as "Elvaloy 742".

Coal tar pitch may be used as such or in admixture with bitumen of natural or synthetic origin, e.g. an unmodified or modified bitumen from the primary or secondary refining of petroleum. Any bitumen present is preferably in an amount of less than 30% by wt of the pitch/bitumen mixture. The pitch may have a softening point (ring and ball) in the range 80° to 150° C., preferably around 105° C. and may be that known as electrode pitch.

The sheeting of the invention would normally contain particulate and fibrous fillers. Particulate fillers include reinforcing fillers such as carbon black, silica, zinc oxide, phenolic resin and magnesium carbonate, and non-reinforcing fillers such as calcium carbonate (whiting), barium sulphate, hydrated aluminium silicate, china clay and magnesium silicate. The total amount of particulate filler is suitably 0 to 30%, based on the total composition, and preferably the total amount of particulate filler does not exceed 20%. Fibrous fillers include natural fibres including inorganic or mineral fibres, wool and cotton, as monofilament or yarn and synthetic fibres, for example nylon and polyester, as monofilament or yarn. The fibrous filler may conveniently be comminuted waste conveyor belting or other suitable waste fabric.

A plasticiser for the PVC is preferably incorporated in the sheeting, this may be, for example a phthalate ester, an ester of sebacic or adipic acid, a phosphate ester or oxidised soya bean oil. Suitably, the plasticiser is present in an amount of not more than 8% of the total composition.

Processing aids include internal and external lubricants and are well known in PVC compounding. Suitably, the composition also contains an amount of a stabiliser to prevent degradation of the PVC or ethylene vinyl acetate carbon monoxide terpolymer during high temperature processing.

The compositions to make up the sheeting of the invention may be processed by mixing in a compounding roll mill, a Buss Ko Kneader or a Banbury type mixer, and sheeted by calendering or extrusion. Preferably the PVC and ethylene vinyl acetate carbon monoxide terpolymer, together with plasticiser, fibre, processing aid and stabiliser are admixed in a first step. Preferred melt temperatures are 140° to 160° C. When the first group of components have been thoroughly mixed and mixture has gelled, the pitch and particulate filler are added and mixing continued. The sheeting produced may be annealed in order to reduce or eliminate built in strain resulting from the sheet formation.

The sheeting of the invention may comprise or be laminated with a reinforcing fabric such as a woven or non-woven polyester or glass scrim. In addition, the surface of the sheet may be treated by embossing or other roughening process to increase its adhesion to mortar, concrete etc. Suitable thicknesses for the sheeting are 0.5 to 2.5 mm and it may be produced in any convenient width, suitably 0.5 to 1.5 m. preferably 0.8 to 1.2 m.

This invention will now be described by reference to the following Example.

EXAMPLE

A sheeting 1.5 mm thick was manufactured by compounding the components listed below, except pitch and whiting, in an unheated Banbury mixer for 2 min, followed by mixing in the pitch and whiting for 1 min. The resulting composition was callendered into sheeting of the desired thickness and 1 m wide.

| Component | % by wt of total |
|---|---|
| PVC "Scon 5410" | 27 |
| Ethylene vinyl acetate carbon monoxide terpolymer "Elvaloy 742" | 27 |
| Fibre-comminuted "Dunlop" conveyor belting | 8 |
| Plasticiser "Cereclor 45", a chlorinated paraffin containing 45% chlorine produced by ICI. | 5 |
| Lubricant: Stearic acid | 1 |
| Stabiliser: Basic lead carbonate | 1 |
| Electrode Pitch (105° C. R & B) | 20 |
| Filler: Whiting | 11 |

The sheeting was subjected to a number of tests conventional in the evaluation of waterproof sheeting and exhibited the following results.

| Test | Machine Direction | Cross Direction |
|---|---|---|
| Tensile Strength (1) | 78 kg/cm² | 54 kg/cm² |
| Elongation at Break (1) | 150% | 210% |
| Low temperature flexibility (2) | −7° C. | |
| High Temperature (80° C.) Tensile Strength (1) | 10 kg/cm² | 7 kg/cm² |
| Tear Strength at ambient (3) | 35 kg/cm² | 30 kg/cm² |
| Dimensional stability at 60° C. | −1% | |
| at 80° C. | −1% | |
| Change in softening point of bitumen bonded to sheeting at 60° C. | −4% | |
| at 80° C. | −8% | |

Notes (a) British Standard Test Methods BS2781.1970(1) Method 301D, modified to a strain rate of 50 mm/min (2) Method 104B (3) Method 308D.

(b) The method of manufacture causes orientation of fibres, so that the sheeting exhibits different properties in the longitudinal (machine) direction and the cross direction.

It can be seen that dimensional stability is extremely good for sheeting of this type, which often exhibits shrinkage of 6 to 10%. The change in the softening point of the bitumen bonding layer is insufficient to cause serious problems of delamination, and in general the sheeting of the invention exhibits acceptable properties over a wider temperature range than conventional sheeting.

We claim:

1. A waterproof sheeting comprising 10 to 40 parts by weight of unplasticised poly vinyl chloride, 10 to 40 parts of an ethylene vinyl acetate carbon monoxide terpolymer and 5 to 35 parts of coal tar pitch.

2. A sheeting as claimed in claim 1, containing up to 30 parts of particulate filler.

3. A sheeting as claimed in claim 2, containing up to 20% by weight of particulate filler, based on the total composition.

4. A sheeting as claimed in claim 1, containing up to 25 parts of fibrous filler.

5. A sheeting as claimed in claim 1, containing up to 15 parts of a primary plasticiser and/or a secondary plasticiser.

6. A sheeting as claimed in claim 1, containing up to 10 parts of processing aids and/or stabilisers to prevent degradation of the poly vinyl chloride during high temperature processing.

7. A sheeting as claimed in claim 1, wherein the terpolymer contains 15–85% ethylene, 5–60% vinyl acetate and 0.5–30% carbon monoxide, by weight.

8. A sheeting as claimed in claim 1, wherein the pitch has a softening point in the range 80° to 150° C.

* * * * *